United States Patent [19]

Kounev

[11] Patent Number: 5,484,615
[45] Date of Patent: Jan. 16, 1996

[54] APPARATUS AND METHOD FOR MICROBIOLOGICAL DECONTAMINATION OF POULTRY

[75] Inventor: Zheko V. Kounev, Goshen, Ind.

[73] Assignee: Maple Leaf Farms, Inc., Milford, Ind.

[21] Appl. No.: 54,306

[22] Filed: Apr. 30, 1993

[51] Int. Cl.[6] .............................. A22C 21/00; A23B 4/00
[52] U.S. Cl. .............................. 426/238; 99/451; 99/516; 426/506
[58] Field of Search ................................. 426/238, 506, 426/320, 335, 532; 422/20, 28, 292; 99/451, 516

[56] References Cited

U.S. PATENT DOCUMENTS

| | | | |
|---|---|---|---|
| 3,743,523 | 7/1973 | Bodine | 426/238 |
| 4,196,221 | 4/1980 | Dew | 99/451 |
| 5,227,184 | 7/1993 | Hurst | 426/320 |

*Primary Examiner*—George Yeung

[57] ABSTRACT

Apparatus for decontaminating poultry carcasses is disclosed. The apparatus includes a tank which has an auger to transport the carcasses from the inlet to the outlet while a disinfectant solution is introduced into the tank. The apparatus also includes one or both of the following devices: 1) an ultrasonic wave generator which directs ultrasonic waves at the carcasses in the tank; or 2) a fluid pump and conduit terminating in the tank to direct a pressurized curtain of fluid at the carcasses passing through the tank.

13 Claims, 3 Drawing Sheets

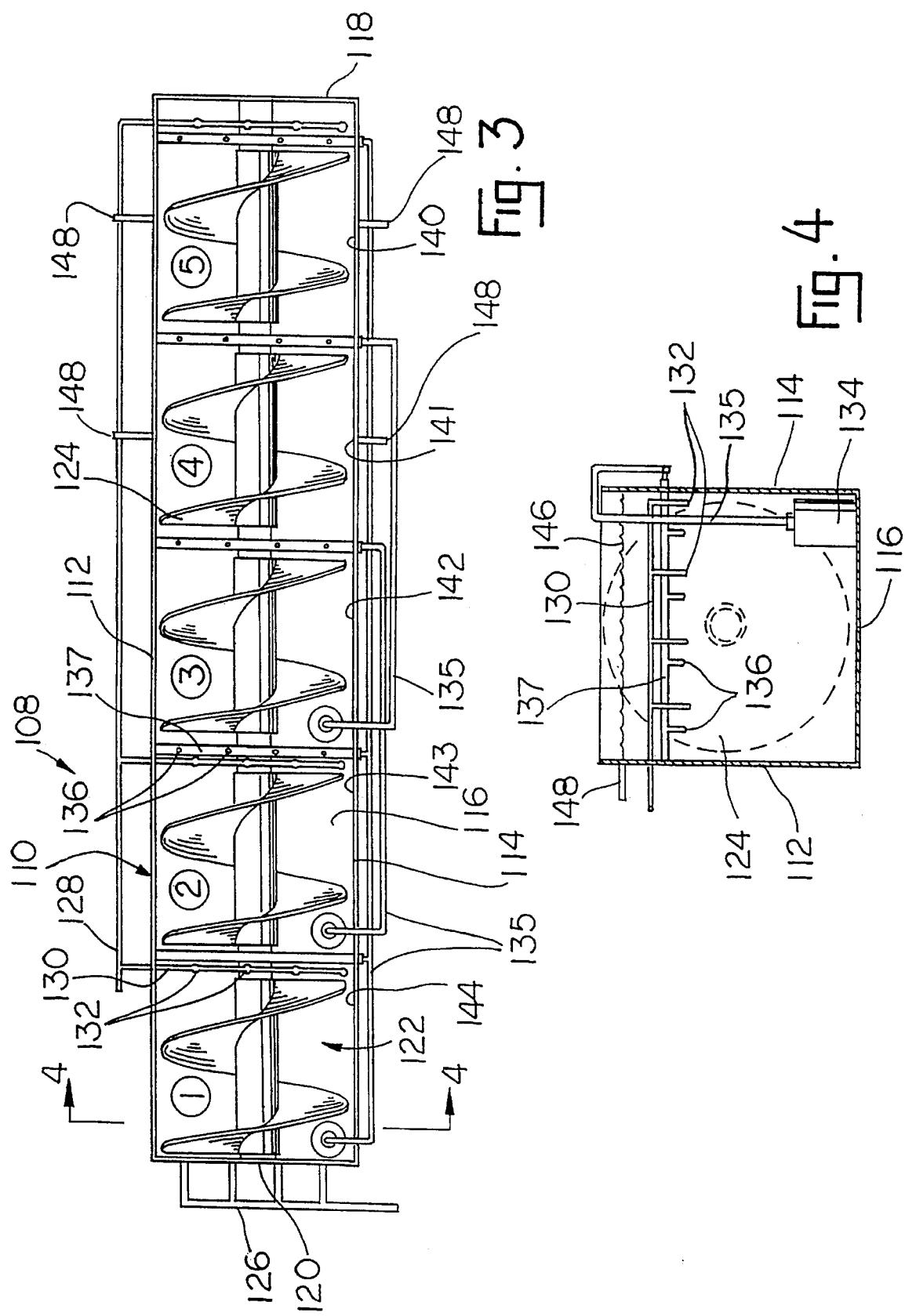

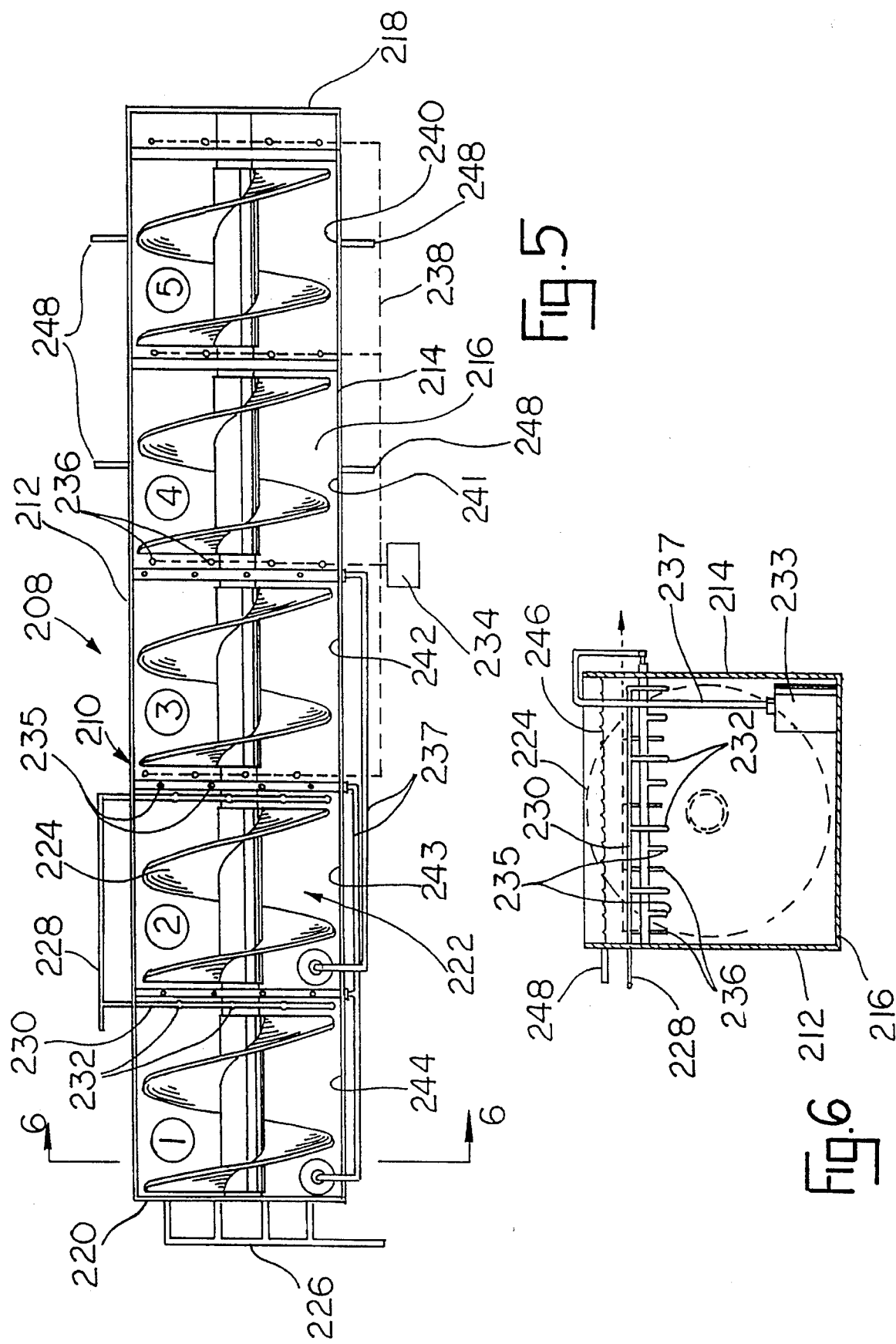

APPARATUS AND METHOD FOR MICROBIOLOGICAL DECONTAMINATION OF POULTRY

FIELD OF THE INVENTION

This invention relates to an apparatus and method for decontaminating poultry carcasses.

BACKGROUND OF THE INVENTION

Commercial poultry producers have long had to deal with the problem of bacterial contamination of the processed birds. Poultry is especially susceptible to such contamination and is especially difficult to decontaminate due to the tendency of the bacteria to cling to the skin and feather follicles. Cross-contamination of processed birds often occurs in the chilling phase of the processing when the birds are transported in masse through a cold water treatment to lower the temperature of the eviscerated carcasses.

Some of the more common pathogenic bacteria observed in poultry are Salmonella, E. coli, L. monocytogenes, and C. JeJunt. Recent studies have shown that between 30%–50% of frozen or refrigerated chicken carcasses are contaminated to some extent with Salmonella bacteria. Salmonellosis, as a common and often serious gastrointestinal disorder results from consumption of contaminated meat, most often from poultry products. Approximately two million cases of salmonellosis are reported annually in the United States alone.

Efforts have been made in an attempt to reduce the presence of Salmonella and other bacteria from poultry carcasses. A summary of the recent efforts was published in the Journal of Applied Poultry Research and is appended to this application. Various methods were explored in these efforts, namely counter current scalding; addition of a bird wash at the end of the scalder; addition of 20 ppm chlorine to the bird wash in the picking room, the water in the transfer belt and the final wash; and addition of chlorine into the chill water.

As shown in the above-noted publication, none of these processes are successful in removing all pathogenic bacteria from the contaminated carcasses. A probable reason for the failure of previous efforts at decontamination is that a thin film of water often forms around the carcass during chilling operations. This film forms a barrier which prevents direct contact of the skin and feather follicles by the disinfectant. The end result is that bacteria remain on the carcass even after disinfection treatments. The contamination problem has degenerated to the point that regulatory agencies such as the USDA and FDA are considering the adoption of regulations which would require total irradiation of all poultry carcasses to destroy the bacteria and further prevent the spread of foodborne diseases.

SUMMARY OF THE INVENTION

This invention provides for an apparatus which will effectively destroy the film of water around the poultry carcasses to ensure maximum contact of the disinfectant with the carcass. The apparatus includes a modified chilling tank which includes a conventional auger to transport the carcasses from the inlet to the outlet.

One or more devices are disposed in the tank to achieve the function of destroying the water film on the carcasses. The first preferred device involves the creation of ultrasonic waves which are introduced into the tank and directed at the poultry carcasses during operation of the chilling tank, The ultrasound destroys the water film and also loosens the skin to allow for maximum contact by the disinfectant already present in the chilling water.

The second preferred device involves the use of pressurized water which is urged by a pump to a series of nozzles disposed in the chilling tank. The nozzles are arranged so that the pressurized water is forced out in a sheet pattern to form a water curtain. The water curtain partition the tank and its water stream into distinct sections. Further, the water curtains destroy the water film on the carcasses, and also serve to dislodge bacteria from the skin. Further, the pressurized water acts as a stirring mechanism to ensure maximum spread of the chemical disinfectant, and also to stir dislodged contaminants, which then exit the tank separate of the carcasses.

The third preferred embodiment involves a combination of both the ultrasound and the water curtain devices above described. This embodiment attains the advantages of each of the individual methods and devices described above.

Accordingly, it is an object of this invention to provide for a novel apparatus to chill and decontaminate eviscerated poultry carcasses.

Another object is to provide for novel methods of decontaminating poultry.

Another object is to provide an apparatus for decontaminating poultry carcasses which allows for maximum contact of chemical disinfectant with the skin and feather follicles of the carcasses.

Other objects will become readily apparent upon a reading of the following description.

BRIEF DESCRIPTION OF THE DRAWINGS

FIG. 3 is a top plan view of a second embodiment of the apparatus with the water curtain generator.

FIG. 4 is a cross-sectional view taken along line 4–4 of FIG. 3.

FIG. 5 is a top plan view of a third embodiment of the apparatus which utilizes both the ultrasound and the water curtain generators.

FIG. 6 is a sectional view taken along line 6–6 of FIG. 5.

DESCRIPTION OF THE PREFERRED EMBODIMENTS

The preferred embodiments herein described are not intended to be exhaustive or to limit the invention to the precise forms disclosed. They are chosen and described to best explain the principles of the invention and its application and practical use to best enable others skilled in the art to follow its teachings.

Figure 1:
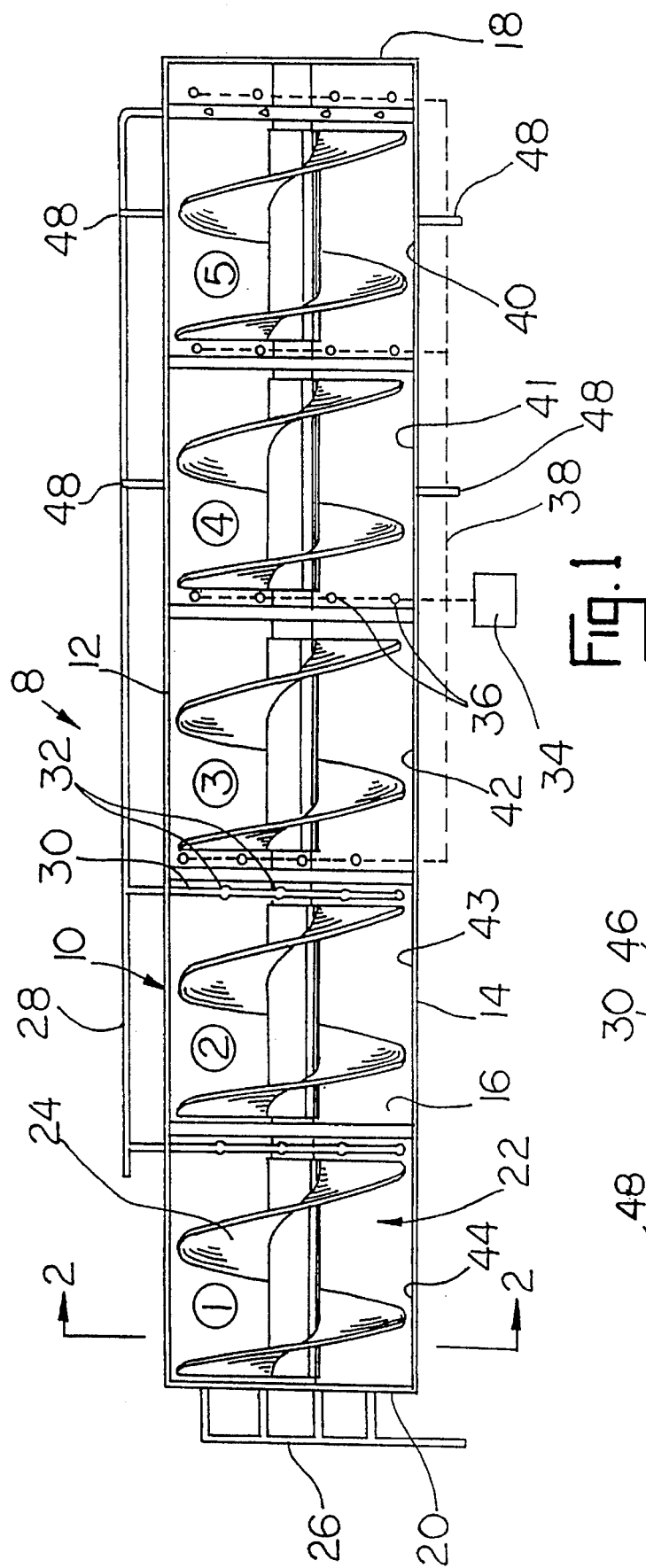
FIG. 1 is a top plan view of a first embodiment of the decontamination apparatus shown with the ultrasonic wave generator.
Figure 2:
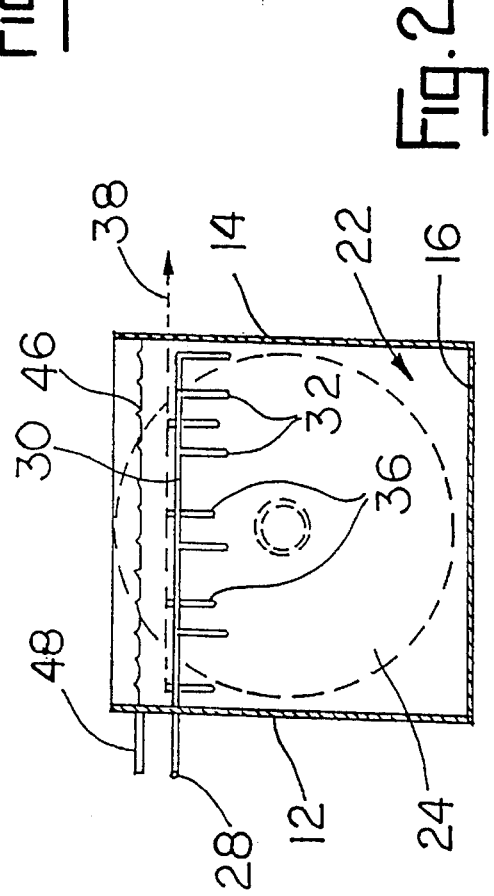
FIG. 2 is a cross-sectional view taken along line 2–2 of FIG. 1.

FIGS. 1 and 2 illustrate a first embodiment of chiller/decontamination apparatus 8. Apparatus 8 includes generally a tank 10 defined by side walls 12, 14, bottom wall 16, and end walls 18, 20. Walls 12–20 define an interior chilling/decontamination chamber 22. A transport auger 24 is rotatably housed within chamber 22 and is journalled for rotation therein by conventional bearings (not shown). Auger 24 serves to transport eviscerated poultry carcasses (not shown) from an inlet (not shown) near end wall 18 through tank 10 to an outlet (not shown) near end wall 20. Other equivalent transport means can be readily substituted for auger 24.

Apparatus 8 also includes conduit 26 which provides for introduction of fresh chilled water through end wall 20 to provide for a countercurrent flow of water through the tank 10, that is chill water flow is opposite the direction of carcass movement due to rotation of auger 24. Chilled water may be urged through conduits 26 by a pump (not shown) or by natural current.

Apparatus 8 also includes conduit 28 which carries a disinfectant solution for introduction into tank 10. Conduit 28 preferably branches into manifolds 30 positioned at various locations near the top water layer 46 of the tank 10. Each manifold 30 includes several dispensing outlets 32 which are directed downward into chamber 22 towards Bottom wall 16.

The disinfectant solution may consist of any commercially used and FDA approved bactericide which exhibits effectiveness against bacteria commonly found in poultry. The most commonly used disinfectant is a weak chlorine solution which contains 1–20 ppm free chlorine.

Finally, apparatus 8 includes an ultrasonic wave generator 34. Ultrasonic generator 34 is connected to a plurality of pulsers 36 positioned at various locations in tank 10. Pulsers 36 are connected to generator 34 by conventional sound-carrying conduits 38 and are positioned so as to direct their waves at the carcasses flowing through chamber 22 under the influence of auger 24.

In the preferred embodiment shown in FIGS. 1 and 2, chamber 22 is partitioned into five discreet sections 40, 41, 42, 43 and 44. The number of chamber sections is in no way limiting, but merely represents the desired number of treatment sections considered to provide the maximum effectiveness of the decontamination function to be performed by apparatus 8. Likewise the positioning of the various discharge outlets 32 and pulsers 36 are shown in their most preferred orientations and are not to be considered limiting by example.

In the embodiment shown, the first set of outlets 32 and pulsers 36 is located in section 40 adjacent end wall 18 near the inlet for the poultry carcasses. More pulsers 36 are positioned between chambers 40 and 41, 41 and 42, and 42 and 43. Additional outlets 32 are positioned at the entry to chambers 43 and 44.

Apparatus 8 operates to chill and provide bacteriological decontamination of poultry passing through tank 10 in the following manner. With the apparatus 8 configured as shown in FIG. 1, chill water is continuously introduced into chamber 22 through conduits 26. Chill water temperature is preferably between 33° F.–35° F. The chill water fills tank 10 to a predetermined level 46 and excess is drawn off through water exit conduits 48 in side walls 12, 14 near the top of the tank.

Once tank 10 is filled with chill water, eviscerated carcasses are introduced into the tank near end wall 18. Ultrasonic generator 34 is switched on and disinfectant is continually introduced into chamber 22 through outlets 32.

Almost immediately upon entering chamber 22, the carcasses encounter the ultrasonic waves generated through pulsers 36 into the water in the chamber section 40. The waves attack and breaks up any film of water which tends to form around the carcass and also serve to drive attached bacteria from the skin and the feather follicles. Disinfectant in the chill water kills bacteria driven off the carcasses and also kills bacteria not driven off by ultrasound due to the break-up of the water film on each carcass.

As the carcass pass through chambers 40, 41, 42 under the influence of auger 24, they are continually bombarded by ultrasound from the second and third sets of pulsers 36 to resist any water film buildup and to remove attached bacteria not destroyed in chamber section 40. Disinfectant solution continually flows into the counter current stream through outlets 32 in chambers 43 and 44.

As a result of the constant ultrasound bombardment and the counter current flow of chill water and disinfectant the water in chambers 40–44 becomes progressively cleaner and more bacteria free as the carcasses flow through under the influence of auger 24. By the time the carcasses reach chamber 44 they encounter disinfectant and the incoming fresh water so that each carcass receives the maximum exposure to the disinfectant and fresh water to ensure thorough cleaning.

FIGS. 3 and 4 illustrate apparatus 108 which includes tank 110 defined by side walls 112, 114, bottom wall 116 and end walls 118, 120. Walls 112–120 define chamber 122. Transport auger 124 is rotatably housed in chamber 122 and is journalled therein for rotation by conventional bearings (not shown). Tank 110 and auger 124 function the same as tank 10 and auger 24.

Conduits 126 and 128 serve to introduce fresh water and disinfectant solution into chamber 122 as described above in the disclosure of apparatus 8. Manifolds 130 and outlets 132 serve to introduce disinfectant into chamber 122 at several selected locations.

Apparatus 108 also includes one or more water pumps 134. As shown in FIGS. 3 and 4, pumps 134 are located in chamber 122 and are connected by conduits 135 to manifolds 137. Nozzles 136 in each manifold serve to direct the pressurized water from pump 134 down towards bottom wall 116 in curtain or sheet form.

As with apparatus 8, apparatus 108 is partitioned into five discreet sections 140, 141, 142, 143 and 144. There is no defined wall to separate each chamber section, rather the sections 140–144 are separated by a water curtain directed downward from nozzles 136 towards bottom wall 116.

Apparatus 108 operates in similar fashion as apparatus 8. As the carcass pass beneath each water curtain the water film is attacked and broken down to allow the disinfectant to kill bacteria both detached from the carcass and bacteria on the skin and feather follicles of the carcass.

In the embodiment shown in FIGS. 3 and 4, the water pumps 134 draw water directly from the chill water in tank 110. It is also possible to position pumps 134 outside tank 110 and connect each pump to a supply of fresh chill water without deviating from the spirit of the invention. Finally, as shown, it is preferred to position the disinfectant outlets 132 slightly lower than the water curtain nozzles 136 to allow the latter to perform a secondary function of circulating disinfectant in the tank to ensure maximum contact with the carcasses.

By spacing the nozzles 136 as shown, the carcasses progressively enter chambers of 140–144 of cleaner and cleaner water. This limits the possibilities of cross-contamination and results in substantially clean, bacteria-free carcasses exiting tank 110.

FIGS. 5 and 6 illustrate apparatus 208 which includes tank 210 defined by side walls 212, 214, bottom wall 216 and end walls 218, 220. Chamber 222 is defined in tank 210 and preferably defines chamber sections 240, 241, 242, 243 and 244. Auger 224 is journalled in chamber 222 as shown.

Fresh chill water is introduced into tank 210 through conduit 226. Disinfectant is introduced into tank 210 through nozzles 232 in manifolds 230 of conduit 228. Ultrasonic waves are introduced into chamber sections 240, 241 and 242 through pulsers 236 connected via sound conduits 238 to ultrasound generator 234. Water curtains, as described above separate chamber sections 241 and 242, 242 and 243, and 243 and 244 as shown. The water curtains are dispensed into the tank 210 through nozzles 235 connected to water pumps 233 by conduits 237.

The functions of the elements of apparatus 208 are the same as those in apparatus 8 and apparatus 108. The combination of ultrasound and water curtain treatments ensures the breakdown of the water film around the carcasses and maximum detachment of bacteria from the skin and feather follicles. The water curtain nozzles 235 between chambers 243, 244 may be slightly inclined away from vertical so as to stir settling contaminants which will eventually exit the tank as the top layer through water exits 248.

It is to be understood that the invention is not limited to the above-given details, but may be modified within the scope of the following claims.

I claim:

1. Apparatus for bacteriologically decontaminating poultry comprising a tank having an inlet and an outlet, said tank defining a chamber, means housed in said chamber for transporting poultry from said inlet to said outlet, said tank further including means for introducing anti-bacterial disinfectant solution into said chamber between said inlet and said outlet, said apparatus further including means for generating ultrasonic waves, and outlet means located in said chamber connected to said means for generating for directing said ultrasonic waves at said poultry passing through said chamber.

2. Apparatus of claim 1 wherein said outlet means is located in said tank upstream of said means for introducing.

3. Apparatus of claim 1 wherein said tank defines a second chamber, said outlet means positioned in said tank between said first-mentioned chamber and said second chamber.

4. Apparatus of claim 3 wherein said means for introducing is positioned in said first-mentioned chamber.

5. Apparatus of claim 4 wherein said outlet means is positioned in said second chamber.

6. Apparatus of claim i wherein said tank includes a liquid entrance and a liquid exit in said chamber to generally fill the chamber with liquid.

7. Apparatus of claim 6 wherein said apparatus further includes a liquid pump, conduit means for carrying liquid from said pump terminating in a nozzle located in said chamber, said nozzle disposed to dispense liquid under pressure towards said poultry passing through said chamber.

8. Apparatus of claim 3 wherein said apparatus further includes a liquid pump, conduit means for carrying liquid from said pump terminating in a spray nozzle positioned in one of said first-mentioned and second chambers, said nozzle disposed to dispense liquid under pressure towards said poultry passing through said chambers.

9. Apparatus of claim 1 wherein said means for transporting includes an auger positioned in said chamber, means for journalling said auger in said tank wherein the auger is rotatable relative to the tank.

10. Apparatus for decontaminating poultry comprising a tank having an inlet and an outlet, said tank defining a chamber, means housed in said chamber for transporting poultry from said inlet to said outlet, said tank including means for introducing disinfectant solution into said chamber between said inlet and said outlet, said apparatus further including a liquid pump, conduit means for carrying liquid from said pump into said chamber and terminating in a nozzle means for dispensing said liquid under pressure in a sheeting form at said poultry.

11. Apparatus of claim 10 wherein said tank defines a second chamber, said nozzle means positioned in said tank between said first-mentioned chamber and said second chamber.

12. A method of decontaminating poultry comprising the steps of:

a) introducing poultry into a tank having an inlet and an outlet;

b) introducing disinfectant solution into said tank;

c) transporting said poultry from said inlet to said outlet through said solution; and d) directing ultrasonic waves at said poultry as it is transported through said tank.

13. A method of decontaminating poultry comprising the steps of:

a) introducing poultry into a tank having an inlet and an outlet;

b) introducing disinfectant solution into said tank;

c) transporting said poultry from said inlet to said outlet through said solution; and d) directing a curtain of pressurized liquid at said poultry as it is transported through said tank.

* * * * *

UNITED STATES PATENT AND TRADEMARK OFFICE
CERTIFICATE OF CORRECTION

PATENT NO. : 5,484,615
DATED : Jan. 16, 1996
INVENTOR(S) : Zheko V. Kounev

It is certified that error appears in the above-indentified patent and that said Letters Patent is hereby corrected as shown below:

On the title page, delete the Assignee

Signed and Sealed this

Eighteenth Day of June, 1996

*Attest:*

BRUCE LEHMAN

*Attesting Officer*  *Commissioner of Patents and Trademarks*